UNITED STATES PATENT OFFICE.

JACOB HOMMEL, OF LOS ANGELES, CALIFORNIA.

HEAT-INSULATING PAINT.

SPECIFICATION forming part of Letters Patent No. 664,154, dated December 18, 1900.

Application filed June 26, 1900. Serial No. 21,677. (No specimens.)

*To all whom it may concern:*

Be it known that I, JACOB HOMMEL, a citizen of the United States, residing at Los Angeles, in the county of Los Angeles and State of California, have invented a new and useful composition of matter to be used to prevent the passage through any substance treated therewith of heat or air and which will have a tendency to render the substance treated non-combustible and non-perishable, of which the following is a specification.

My composition consists of the following ingredients, combined in the proportions stated, viz: I take fifty gallons of pure strong vinegar and heat it to the boiling-point—viz., 212° Fahrenheit. Then I add eight pounds of alum and four pounds of glue. After becoming thoroughly mixed the mixture is permitted to cool. I then add sixty pounds of pulverized mineral asbestos and twelve pounds of saltpeter. Then the ingredients are thoroughly mixed by agitation. The mixture is applied to the substance to be treated in any suitable manner, as with a paint-brush, and any number of coats desired may be applied. One coat thoroughly applied will ordinarily be sufficient; but two or more coats may be applied in cases where extreme reliability is required. When applied to wood, the wood should be thoroughly seasoned and free from cracks and knots. This substance when placed on wood will render it impervious to air or heat and give it a tendency to resist combustion and decay, and the contents of any casing thus treated will be protected from the effects of these elements.

The principal object of my invention is to impart to refrigerators, furnaces, steam-fittings and the like the quality of resisting the effects of cold or heat and to maintain therein a uniform temperature for a long period of time, and it is especially valuable in the preservation of fruits, vegetables, and other articles injuriously affected by a change of temperature or excessive heat or cold, and more especially it is desirable in the transportation of these articles on long distances through a variety of temperatures in the atmosphere through which they are transported when it is imperative that a uniformity of temperature be maintained.

Having described my invention, what I claim is—

1. The herein-described composition of matter, consisting of vinegar, asbestos, saltpeter, alum and glue, substantially as described, and for the purposes specified.

2. The herein-described composition of matter, for rendering substances treated therewith impervious to heat or air, consisting of, fifty gallons of strong vinegar; twelve pounds of saltpeter; eight pounds of alum; four pounds of glue; sixty pounds of pulverized asbestos.

In witness that I claim the foregoing I have hereunto subscribed my name, this 18th day of June, 1900, at Los Angeles, California.

JACOB HOMMEL.

Witnesses:
HENRY T. HAZARD,
G. E. HARPHAM.